(12) United States Patent
Kraut-Reinkober et al.

(10) Patent No.: US 10,874,256 B2
(45) Date of Patent: Dec. 29, 2020

(54) COOKING POT FOR A FOOD PROCESSOR, FOOD PROCESSOR AND METHOD FOR THE PRODUCTION OF A HEATING ELEMENT

(71) Applicant: Vorwerk & Co. Interholding GmbH, Wuppertal (DE)

(72) Inventors: Stefan Kraut-Reinkober, Leverkusen (DE); Sebastian Tietz, Bonn (DE); Jan-Martin Loth, Essen (DE)

(73) Assignee: Vorwerk & Co. Interholding GmbH, Wuppertal (DE)

(*) Notice: Subject to any disclaimer, the term of this patent is extended or adjusted under 35 U.S.C. 154(b) by 288 days.

(21) Appl. No.: 15/852,897

(22) Filed: Dec. 22, 2017

(65) Prior Publication Data

US 2018/0177340 A1 Jun. 28, 2018

(30) Foreign Application Priority Data

Dec. 23, 2016 (DE) .................. 10 2016 125 678
May 8, 2017 (EP) .................... 17169946

(51) Int. Cl.
*A47J 43/07* (2006.01)
*H05B 3/26* (2006.01)
(Continued)

(52) U.S. Cl.
CPC ......... *A47J 43/0716* (2013.01); *A47J 27/004* (2013.01); *A47J 43/046* (2013.01);
(Continued)

(58) Field of Classification Search
CPC .... A47J 43/0716; A47J 27/004; A47J 43/046; A47J 36/02; A47J 36/2483;
(Continued)

(56) References Cited

U.S. PATENT DOCUMENTS

2011/0186668 A1 8/2011 Seidler et al.

FOREIGN PATENT DOCUMENTS

| CN | 201388936 Y | 1/2010 |
| CN | 201422742 Y | 3/2010 |

(Continued)

OTHER PUBLICATIONS

Notification of the First Office Action for Chinese Patent Application No. 201711422972.X, dated Oct. 11, 2019, and its English translation, 8 pages.

(Continued)

*Primary Examiner* — John C Hong
(74) *Attorney, Agent, or Firm* — Rudy J. Ng; Bret E. Field; Bozicevic, Field & Francis LLP

(57) ABSTRACT

The present invention relates to a cooking pot for a food processor with a heating element, wherein the heating element includes a heating device for generating heat and a heat exchanger with a heat-absorbing side at which the heat exchanger is heatable by the heating device and a heat emission side for heating of foodstuff in the food processor. The heat exchanger includes an opening for a stirrer and a first functional layer at the heat emission side. The heat exchanger includes at least partially a metallic heat conducting layer, which is arranged with the first functional layer such that the heat generated by the heating device is transferable extensively from the heat conducting layer to the first functional layer.

19 Claims, 5 Drawing Sheets

Figure 1:
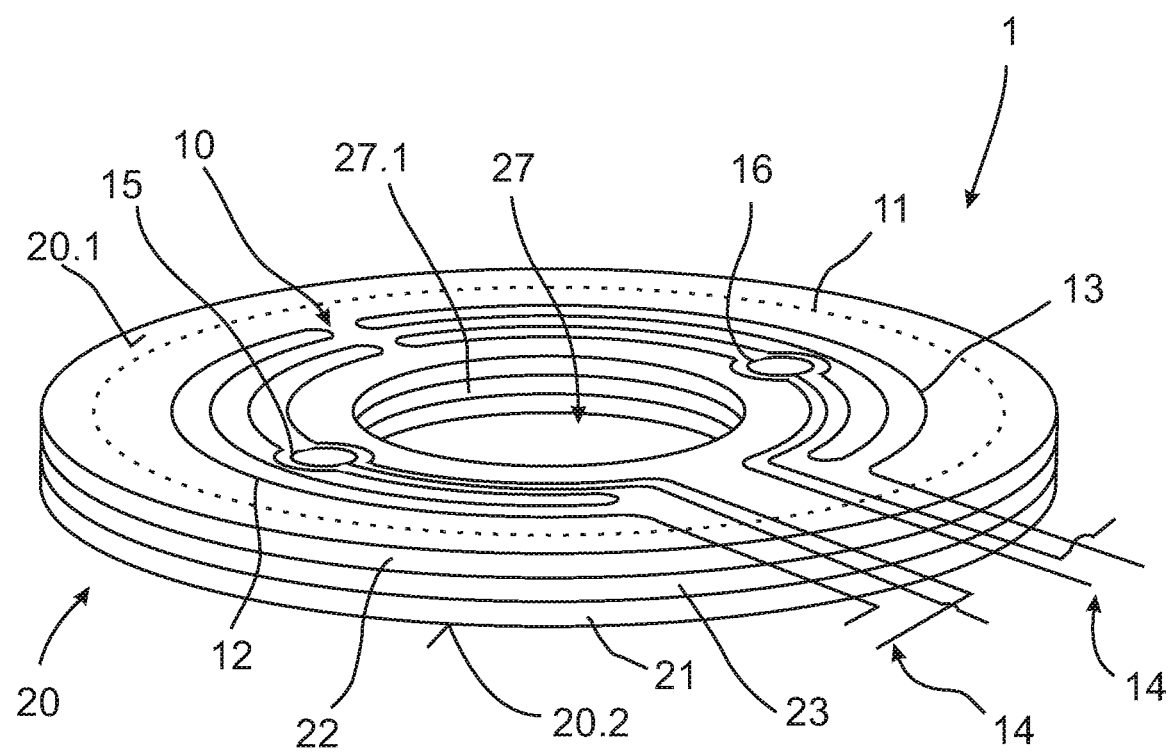

(51) Int. Cl.
    *A47J 43/046*    (2006.01)
    *A47J 27/00*     (2006.01)
(52) U.S. Cl.
    CPC ......... *H05B 3/26* (2013.01); *H05B 2203/013* (2013.01); *H05B 2203/017* (2013.01)
(58) Field of Classification Search
    CPC . A47J 43/0722; H05B 3/26; H05B 2203/013; H05B 2203/017
    See application file for complete search history.

(56)            References Cited

FOREIGN PATENT DOCUMENTS

| CN | 103349492 A | 10/2013 |
| CN | 203447188 U | 2/2014 |
| DE | 9411507 U1 | 10/1994 |
| DE | 29710464 U1 | 8/1997 |
| EP | 1274333 A1 | 1/2003 |
| EP | 1177708 B1 | 11/2005 |
| EP | 2237710 B1 | 7/2011 |
| WO | WO0178569 A1 | 10/2001 |

OTHER PUBLICATIONS

Search Report for Chinese Patent Application No. 201711422972.X, dated Sep. 26, 2019, and its English translation, 5 pages.
Communication under Article 94(3) EPC for European Application No. 17169946.5 dated Jun. 14, 2018, with its English summary, 11 pages.
Extended European Search Report for European Application No. 17169946.5 dated Aug. 12, 2019, with its English summary, 4 pages.
Second Office Action for Chinese Application No. 201711422972.X dated Jul. 15, 2020, with its English translation, 9 pages.

COOKING POT FOR A FOOD PROCESSOR, FOOD PROCESSOR AND METHOD FOR THE PRODUCTION OF A HEATING ELEMENT

The present invention relates to a cooking pot for a food processor according to the present disclosure, a food processor according to the present disclosure, and a method for the production of a heating element for a cooking pot.

For heating of food diverse devices for the use in a kitchen are known. Thus, for example different kinds of pots are known in which food can be heated such that the pot is subjected to heat from the outside. In order to ensure such a passive heat conduction to the food further different materials for the pot are known, wherein such pots however normally only work with an external heating source like, for example a stove.

A further kind of kitchen devices are food processors. Food processors unite in general a plurality of functions for preparing food such that for a user this preparation is facilitated. For cooking or heating of food some food processors comprise an active heating through which heat is generated. In comparison to a normal pot different requirements are often applied to a kitchen utensil. Thus, in a kitchen utensil the heating of food should occur possibly precise and diverse further functions and components within the food processor have to be taken into account during the design of the heating. A heating element for a food processor is for example known from EP 1 274 333 A1. Thereby, a heating means for the heating is arranged underneath a plate such that above the plate food can be heated. Such heating elements already comply with different requirements which are demanded for future requirements with which the electronic of the food processor is more important. The requirements to the accuracy of the temperature treatment and/or the temperature measurement are increasing such that possibilities of optimization are existent.

It is therefore the object oft the present invention to at least partially avoid disadvantages known from the state of the art. Particularly, it is the object of the present invention to enable in at least one area of the food processor a possibly smooth heat distribution and/or temperature measurement in a cost efficient and simple manner.

The previous object is solved by a cooking pot with the features according to the present disclosure, a food processor with the features according to the present disclosure, and a method for the production of a heating element with the features according to the present disclosure.

Further features and details of the invention result from the dependent claims, the description and the drawings. Further features and details which are described in relation to the a cooking pot according to the invention naturally also apply in relation to the food processor according to the invention and the method according to the invention and vice versa, such that according to the disclosure of the single aspects of the invention can always be reciprocally related to.

According to the invention a cooking pot for a food processor comprises a heating element. The heating element further comprises a heating means (particularly a heating means can be a heating device) for generation of heat and a, particularly circular disk-like, heat exchanger with a heat-absorbing side and a heat emission side. Thereby, the heat exchanger comprises an opening for a stirrer. Further, the heat exchanger comprises a first functional layer, particularly for contacting the food, at the heat emission side in the food processor and at the heat-absorbing side the heat exchanger is heatable by the heating means. Thereby, the heat exchanger comprises at the heat emission side a first functional layer, particularly for contacting the food. Further, the heat exchanger comprises at least partially a metallic heat conduction layer which is arranged with the first functional layer such that the heat generated from the heating means is transferable extensively from the heat conduction layer to the first layer.

Thereby, the food processor is preferably suitable for a semi-automatic or automatic preparation of food. Particularly, the heat appliance can be configured multifunctional such that by the food processor multiple functions for preparing food can be performable. Thus, by the food processor both, a heating of the food and stirring can be particularly automatically possible. Further, the food processor can be configured for heating water by the heating element using further attachments such that a steam cooking above the heating element is possible. The heating means is thereby particularly actively heated. Thus, the heating means can for example comprise a thick film heating, an induction heating, a fluid heating with heating tubes which allow fluid to pass or a radiation heating with active heat conductors. The heat exchanger is further configured such that heat is transferred from the heating means to the food. Thereby, the heat exchanger can be configured curved or extensively. Thus, the heat exchanger can be fitted into the bottom of the cooking pot and/or configure the bottom of a cooking pot. Particularly, the cocking utensil and at least the first functional layer can be configured from one material such that a weldability is facilitated. Therewith, the cooking pot can comprise stainless steel. Further, the heat exchanger can comprise a, particularly circumferential edge at its outer side, which is preferably configured collar-like. The edge of the heat exchanger can thereby serve to attach the heating element at the cooking pot of the food processor.

Preferably, the heat exchanger can be configured disk-like. Thereby, the heat exchanger can comprise a homogeneous layer thickness, particularly over the cross section of at least the first functional layer and the heat conducting layer. Particularly, the heat exchanger can be configured circular such that the heat exchanger can at least mainly configure a circular disk. Thereby, the heat exchanger can be further configured such that the diameter of the heat emission side is greater than the sum of the layer thicknesses of the first functional layer and the heat conducting layer in order to enable a favourably production method and at the same time to limit the axial construction space. Between the first functional layer and the heat conducting layer an intermediate space with a distance, particularly of up to 10 mm can be provided, wherein between the first functional layer and the heat conducting layer preferably an air filled space or a vacuum can be provided. Particularly, the intermediate space between the heat conducting layer and the first functional layer can be filled with a heat conducting paste in order to further improve the heat conductivity. Further, the functional layer and the heat conducting layer can be configured by contacting one another, particularly completely such that a direct heat conduction is provided. The first functional layer has a heat conductivity particularly different to the heat conducting layer, wherein the heat conducting layer preferably comprises a higher heat conductivity than the first functional layer. The metallic heat conducting layer is particularly defined such that it comprises a metal or completely consists from metal.

The first functional layer can be preferably from metal. Particularly, the first functional layer can for example comprise a steel, particularly a stainless steel, plastic and/or glass. Thereby, the first functional layer can fulfil diverse functions. Thus, at the first functional layer food can be directly heatable. Further, the first functional layer can be configured decoratively such that a design of the utensil bottom of the cooking pot of the food processor results. Further, the surface of the heating element can comprise an additional coating suitable for foodstuffs at the heat emission side of the heat exchanger. Further, it is possible that for the acceptance of food an additional intermediate bottom above the first functional layer of the heat exchanger is arranged directly or spaced apart at the heat exchanger. The heating element according to the invention is preferably arranged at the bottom side of the cooking pot. Particularly an arrangement at the bottom side includes that food can be heated from below and/or that the heating element is arranged outside a lid of the cooking pot. Thereby, a cooking pot can be a container in which food is heatable, for example up the respective cooking temperature and/or simmering temperature. The cooking pot can therefore be suitable for the acceptance of fluids wherein the heating element can preferably configure the bottom side of the cooking pot.

The heat conducting layer can be configured as a rigid body and for example comprise stainless steel like silver and/or gold. Particularly, preferred a heat conducting material of the heat conducting layer comprises copper and/or aluminium or the heat conducting layer consists of copper and/or aluminium. These materials are easily available and at the same time comprise a good heat conductivity.

Advantageously, a separation of the heat exchanger results in a heat conducting and functional layer such that advantageously heat conducting properties of the heat conducting layer can be combined with other advantageous properties of the first functional layer. Thus, by the first functional layer a weldability can be existent, a reduction of the electric conductivity or suchlike. At the same time an at least partial deflection of the heat within the heating element to positions with a local high heat requirement on the heat emission side results due to the heat conducting layer. Therewith, an even temperature distribution, particularly in transverse direction of the heating element is improved. Particularly, the temperature distribution is homogenised. Further, the heating means can be configured small by the improved temperature distribution such that costs can be saved and for example more construction space is provided for sensors, wherein again an even more precise temperature controlling can be possible. Further, a dynamic heat distribution can be improved. Thus, spatially unevenly distributed food can result in local heat differences, particularly during stirring, at the heat element which can be compensated faster by an improved heat distribution. By the improved temperature controlling and/or temperature measurement in the heating element or in the area at the heating element the possibility results to exactly control an ideal cooking point of the foods such that the food preparation quality is improved.

Within the scope of the invention it can further be provided that the heat conducting layer is arranged between the first functional layer and the second functional layer. Thereby, the heat conducting layer can be arranged sandwich-like between the first functional layer and the second functional layer. By the use of a second functional layer on the side of the heat conducting layer opposing the first functional layer further preferable properties can be combined in the heat exchanger. Thus, a weldability of the heating element in the cooking pot of the food processor can further be improved in that this is possible on both sides. Thereby, a sealing of the heat disk with the cooking pot can be improved such that no contaminations will be collected in the intermediate space of the connecting point. By the weldability and the therewith possible sealing further the requirement at the tolerance of the maximum diameter of the heat exchanger can reduced such that a cost-efficient production is further favoured. By a sandwich-like configuration of the heat exchanger a safe connection through a pressing of the single layers can be realized in a cost-efficient manner. Particularly, by a sandwich-like arrangement the heat conducting layer can directly contact with a first and with a second functional layer. Preferably, a third or further functional layer is possible such that the heat-absorbing side and/or the heat emission side initially two functional layers can be arranged at the heat conducting layer. Thereby, further preferable properties can be integrated into the heat exchanger. Preferably, the ratio of the diameter of the heat emission side of the heat exchanger to the overall thickness of the heat exchanger with the heating means can be between 10 and 250. Thereby, the overall thickness can be a maximum measure of the heat exchanger with the heating means perpendicular to the heat emission side. Such a ratio of diameter of the heat emission side and overall thickness of the heat exchanger with the heating means of the heat element can have the advantage that a temperature is homogeneously transferred from the heating means to the heat emission side and at the same time a cost-efficient production possibility, for example by the use of plates, particularly metal plates, is existent.

It is further possible that with the cooking utensil according to the invention the first and/or second functional layer are configured suitable for foodstuffs. Thereby, the first and/or second functional layer can comprise stainless steel or be made from stainless steel. By a configuration suitable for foodstuff within the scope of the present invention the first and/or second functional layer is from neutral taste and particularly innocuous for the human organism during the intake of food which was in contact with the first and/or second functional layer. Preferably, by the configuration suitable for foodstuff it is further given that the foods do not discolour by contacting with the first or second functional layer. Due to the vicinity to the food it is particularly an advantage when the first functional layer is configured suitable for foodstuffs. Thereby, a small influence of the material on the taste can be completely or almost completely prevented. With the stainless steel it can be preferably an at least partially ferritic stainless steel. Thereby, a cost-efficient production and at the same time a sufficient rigidity with a small heat extension can result. Therewith, a direct contact of the foodstuffs with the first and/or second functional layer can be enabled, wherein an intermediate bottom is not necessary. Thereby, the accuracy with the temperature measurement or with the temperature control of the heating means for heating of the foodstuffs can be improved. Preferably, the first and/or second functional layer can be configured from one material. This bears the advantage that less different materials have to be managed or obtained such that a cost-efficient production of the heating element is improved.

Within the scope of the invention it can further be provided that the opening is arranged in the centre of the heat exchanger and/or that the heat exchanger is configured disk-like. Thereby, the opening can be arranged in the centre of the heat exchanger. The opening can be a recess. Particularly, the opening is configured by the heat exchanger and the heating means is thereby configured continuously. Thereby, the opening can be arranged central as a circular disk with the configuration of the heat exchanger. The stirrer can comprise at least one rotary knife and/or at least one whisk. With a central arrangement of the opening the stirrer can therewith mix the food, particularly evenly or can keep the food in movement. The drive means can for example be a bolt or a fastening means. Thereby, the drive means can be configured pivotably to the heating element such that the food can be moveable by the stirrer on the heat emission side of the heat exchanger. Further, the opening can be configured such that a front face of the opening is coated. The front face of the opening can be an inner area meaning particularly a circumferential surface of the opening of the heat exchanger within the opening. Thereby, an additional corrosion protection for a heat conducting layer on the inner side can be existent. Preferably, the coating of the front face can be configured suitable for foodstuffs. Thus, the coating of the front face can be configured for example from one material with a first and/or second functional layer. By the intention of the opening a drive of the stirrer can be arrangeable below the heating element and therewith enable a direct contact to the food of the heating element and at the same time ensure a reliable stirring without minimizing the filling region by the stirrer. Additionally or alternatively a protective body can be introduced into the opening in order to achieve a protection of the heat conductive layer within the opening, particularly at the circumferential surface of the opening. Thus, the protective body can for example comprise stainless steel in order to provide a corrosion protection for the heat conductive layer. Preferably the protective body can comprise a bushing. According to the invention the heat conductivity in the centre of the heat exchanger can be prevented or interrupted by the opening. This can be particularly desired since in the centre of the heating disk a small relative speed of the stirred food exists and particularly therewith for example a burning can be prevented if in the centre of the heat exchanger not the same heat exchange is realized than in the periphery.

Preferably, with a cooking pot according to the invention it can be provided that a layer thickness of the first functional layer corresponds to between 30% and 70%, preferably between 40% and 60%, particularly preferred approximately 50% of a layer thickness of the heat conducting layer. Thereby, a separation of a transmission thickness of the heat exchanger of the heating element of 25% for the first functional layer, 50% for the heat conducting layer and 25% for the second functional layer results. Thereby, the transmission thickness can be particularly a maximum measure of the heat exchanger in a perpendicular direction. Analogue to the layer thickness of the first functional layer a layer thickness of the second functional layer can correspond to between 30% and 70%, preferably between 40% and 60%, particularly preferred approximately 50% of a layer thickness of the heat conducting layer. Such relations have proven to be particularly advantageous in order to enable a particularly homogeneous temperature distribution and to enable a reliable function of the first and/or second functional layer at the same time. Preferably, the heating element can comprise an overall thickness of below 5 mm, preferably of below 2 mm. Thereby, the weight can be positively influenced by a reduction of the outer layer thickness of the heating element in order to provide a favourable centre of gravity for the cooking pot and further to ensure a comfortable lifting.

Within the scope of the invention it is further possible that the heating element is a heating layer which is directly arranged at the heat conducting layer or the second functional layer. The heating layer can thereby comprise a dielectric in order to electrically isolate an electric component of the heating means from the heat exchanger. A dielectric can therewith comprise material, which comprises a high electric resistance or is at least only weakly conductive. Therewith, an electric component of the heating means can be arranged at the heat exchanger without the necessity that the heat conducting layer or the second functional layer is configured to electrically isolate. Thereby, these can be more flexible in the choice of material concerning further functions like for example weldability or heat conductivity and therewith can be better coordinated for the respective function. Further, the heat conductivity of the heat conducting layer can be increased by a suitable choice of material. Preferably, the dielectric can thereby comprise a temperature dependent electric resistance wherein particularly the dielectric comprises a cold conductor material meaning a PCT resistance or a heat conductor material meaning a NTC resistance. PCT (positive temperature coefficient) hereby describes a positive temperature coefficient and NTC (negative temperature coefficient) a negative temperature coefficient of the material. By a cold conductor material the resistance of the dielectric can increase according to an increasing temperature. In case the food is heated by the heating means the existence of the dielectric increases such that an additional protective effect according to the current supply of the heating means and/or other electric components is achievable. By the heat conducting material the electric resistance of the dielectric can decrease with increasing temperature. Thereby, with a low temperature, particularly at the point of time of a high inrush current an even higher resistance can be existent than during the operation of the heating means and therewith particularly at certain operating points a protective effect can be increased according the current supply and/or the lifespan of the heating means can be increased. By the configuration of the heating means at the heating layer, particularly construction space can be saved since these are configured extensively. Particularly, in the bottom area of the cooking pot this is important since advantageously further components like for example drive means have to be arranged there.

It is further possible with a cooking pot according to the invention that the heating means comprises at least a first resistance element which is wired and/or inductively suppliable with current for the generation of heat. Thereby, at the first resistance element at least sectionally a dielectric can be arranged. Particularly, the first resistance element can be surrounded at least partially by the dielectric. The resistance element can thereby be a wire loop or a bobbin. Thus, for example, the first resistance element can configure the heating layer together with a dielectric. Thereby, the resistance element can be controllable preferably by a control unit. Further, the temperature regulation of the heating means can be realised in that the resistance element is configured that it can be switched on and off in a frequency. In order to ensure a cost-efficient and at the same time reliable isolation of the dielectric, the dielectric can comprise enamel. Enamel preferably is a material which comprises a glass flow, silicates and/or oxides. Preferably, the enamel can comprise a cold conductor material or heat conductor material or be configured as cold conductor material or a heat conductor material. With a wired configuration of the first resistance element the first resistance element can comprise a connecting means through which the first resistance element is connectable with a voltage source. By the dielectric which can be preferably configured as enamel further particularly with a correspondingly configured layer thickness a good heat connectivity can be enabled with at the same time a fast addressing and therewith a fast retrieving of the heat performance. Further, the dielectric can be positively connected with a second functional layer, particularly wherein the dielectric can be vapour coated. By a good processability a further advantage results with this fastening alternative with the use of enamel.

Further, by such an enamel a small layer thickness and therewith a small construction space of the heating element is achievable. While an inductive energization has the advantage that the separate connecting means is not necessary a wired configuration has the advantage that less electromagnetic emission results and an exact robust controlling of the heating means and therewith the temperature setting can be enabled.

Preferably, the heating layer can comprise a protective element which is arranged at heating means, particularly on the opposing side of the dielectric. Further, the protective element can comprise a glass layer. Thus, for example the first and/or the second resistance element can be protected by a protective element from environmental influences like mechanic damage and/or oxidation at least on one side. Further, by the protective element a touching of the heating means can be prevented.

It can be further provided that with the cooking pot according to the invention the heating means comprises a second resistance element which can be supplied with current independent from the first resistance element. Thereby, the second resistance element can be arranged with a dielectric, particularly be surrounded by a dielectric. By the second resistance element a second electric circuit can be provided such that the temperature regulation is favoured. In case this is realised, for example by switching on and off of the resistance element, by the provision of a second or further resistance element a higher frequency is enabled without that for example a power grid is negatively influenced at which the food processor is connected. Further, the accuracy with the temperature regulation can be thereby improved. Preferably, the ratio of the area B, which is directly heated from the resistance element or from the resistance elements in the relation to the surface A of the heat-absorbing side of the heat exchanger amounts preferably between $30\% \leq B/A \leq 100\%$, preferably $B/A > 70\%$. Thereby, the area heated actively by the resistance element or the resistance elements is an area of the heat exchanger which particularly directly abuts at the resistance element(s), particularly with a dielectric.

Within the scope of the invention it is possible that at the heat exchanger at least a first sensor element is arranged. Thereby, the first sensor element can be configured for detecting the temperature. Therewith, the first sensor element can be a temperature sensor, particularly a bimetal sensor, a cold or heat conductor or a semiconductor temperature sensor. Thereby, a control of the heating means can be improved. Particularly, a local controlling of the heating means, for example when multiple heating elements are provided, can be enabled. Further, thereby the cooking temperature can be monitored even better since the heat generation can be directly measured at the heat exchanger and therewith an influence of the heat-absorbing of the foods can be taken into account. Therewith, a preparation quality of the food can further be improved.

With a cooking pot according to the invention it can be preferably provided that by the first functional layer of the heat exchanger a bottom area of the cooking space of the cooking pot is configured. For the improvement of the heat exchange the first functional layer of the heat conduction layer can be arranged below wherein the heat conducting layer is preferably arranged between the first functional layer and the second functional layer. For the generation of heat the heating means can be arranged particularly below the heat exchanger directly at the second functional layer. Preferably, therefore the dielectric is positively connected with the second functional layer of the heat exchanger, particularly wherein the dielectric is vapour coated on the second functional layer. Within the dielectric and/or below the dielectric further preferably the first and the second resistive element can be arranged, particularly wherein the first and the second resistive element is at least partially completely enclosed by the dielectric. By such a configuration a cost efficient production of the heat element and therewith the whole cooking pot results. Further, thereby an extensive construction of the heating element can be achieved, such that at the cooking pot a constructional space for further components can be provided. Particularly, by such a configuration a subfloor space of the cooking pot which is not usable as a cooking space can be kept small. At the same time a heat exchange can be improved by the previously described construction.

According to a further aspect of the invention a food processor with a cooking pot and a drive for a stirrer is claimed. The cooking pot is thereby configured according to a cooking pot according to the invention. Preferably, the drive can be connected with a drive means such that the stirrer can be arranged for example within the cooking pot while the drive can be arranged below the cooking pot. Thereby, preferably the drive means can be guided through the opening of the heat exchanger such that the drive can be arranged below the heating element outside the cooking space of the cooking pot, particularly at the same time a stirring by a stirrer in the cooking space can be provided. The drive can preferably be configured as an electric drive such that for example for the drive and the heating means the same current source can be useable. Therewith, the food processor according to the invention comprises the same advantages like they are already described in detail in relation to the heating element according to the invention.

According to a further aspect of the invention a method for the production of a heating element for a cooking pot for a food processor is claimed. Thereby, the method comprises the following steps:

a) Provision of a heat exchanger comprising the following steps:
Provision of a metallic heating plate and at least one first functional plate, wherein the heating plate and the first functional plate comprise at least one forming area respectively,
Connecting of at least the forming area of the heat conduction plate with the forming area of the first functional plate, wherein a heat conduction plate and at least one first functional layer results with the heat emission side, particularly for contacting of food such that heat is transferable extensively from the heat conducting layer to the first functional layer, b) Arrangement of the heating means at the heat exchanger.

The cooking pot is particularly a cooking pot with a heating element according to the invention as previously described. The food processor is preferably a food processor according to the invention like previously described. A heat conducting plate and a first functional plate can be a plate shaped raw material which comprises a corresponding feed material. Thus, the heat conducting plate can preferably comprise a material which has a higher heat conductivity than the material of the first functional plate. A forming area within the scope of the invention is an area which is suitable being processed to build the heat exchanger. Thus, it can be configured sufficiently great in order to ensure a diameter of the heat emission side of the heat exchanger. It is particularly not necessary that the forming area is separately marked. Therewith, each area of the heat conducting plate and/or the first functional plate can serve as a forming area, particularly as far as respective area comprises the necessary properties like for example size, material surface, a combination of the before mentioned or suchlike. Thereby, only single forming areas or plates can be completely connected. Therewith, a method according to the invention for the production of a heating element comprises the same advantages like they are described in detail in relation to the heating element of a cooking pot according to the invention. Thereby, a cost-efficient possibility is provided to produce a heat element and therewith a cooking pot for a food processor.

It is further possible that with a method according to the invention the provision of the heat exchanger according to step a) comprises further the provision of a second functional plate which comprises a further forming area which is connected with the forming areas of the heat conducting layer and the first functional plate such that a second functional layer of the heat exchanger is configured. Thereby, the forming area of the heat conducting plate can be arranged sandwich-like between the forming areas of the first and second functional plates. In order to ensure a third or a further functional layer further a provision and connection of the respective forming areas of the third or further functional plates are possible. By the provision of the second functional plate a further positive property in the heat exchanger can be integrated such that the heat exchanger is weldable from both sides with a sandwich-like arrangement in order to be connected with the cooking pot.

It is further possible with a method according to the invention that the method comprises the following steps:
  c) Arrangement of at least one first sensor element on the first and/or second functional layer, particularly wherein the second sensor element is arranged such that a temperature distribution is detectable.

Thereby, a temperature and/or temperature distribution can be detectable in a simple and cost-efficient manner, wherein the good heat conductivity of the heat conducting layer within the use of the temperature distribution can at least partially be homogenised and therewith a sensor element can be sufficient for example at the second functional layer in order to determine a reliable temperature distribution. The accuracy of the controlling and measurement can thus be overall improved.

Within the scope of the invention it is further possible that the provision of the heat exchanger according to step a) further comprises the following steps:
  Separation of the forming area from the heat conducting plate and the first and/or second functional plate, particularly wherein the separation of the forming areas from the heat conducting plate and one of the functional plates or both functional plates is provided at the same time.

With the separation further a deformation of the forming areas can be provided at the same time such that the separation can occur in the same method step like a deformation in order to adjust the heat exchanger for example at the bottom geometry of the cooking pot. The separation of the forming areas can preferably be performed by a stamping process. A stamping process is a stamping or fine cutting or suchlike. Particularly, further forming areas can be separated from further functional layers from the respective plate within this method step. Thus, a holding down device in the stamping process can be used to provide a deformation in the forming areas. Additionally or alternatively, it is possible that the stamping process comprises a progressive tooling. Further, the separation of the single forming areas or the forming areas separately from the heat conducting plate and/or the functional plates is provided or the separation can be provided after the connection of the forming areas or a complete connection of the plates. Therewith, a simple progressive tooling results which is subsequently suitable for a simple joining method. Thus, disk-like or plate-like components can be particularly advantageously processed particularly automatized by a stamping method. Thereby, a separation of the forming areas at the same time can result in a particularly high accuracy during the production of the heating element.

It is possible that the arrangement of the heating means at the heat exchanger comprises a pressing of the heating layer, particularly by screen printing to the heat exchanger. The pressing of the heat layer can preferably comprise the application of a first and/or a second resistance element, wherein preferably previous to the application of the first and/or second resistance element at least area wise a dielectric is arranged at the heat exchanger. Likewise, the arrangement of the dielectric can thereby be performed by pressing for example using screen printing or by a spraying process. Therewith, advantages result that the heating means can be arranged, particularly cost-efficient, particularly automatized and with a high accuracy at the heat exchanger. Further, the pressing is suitable as a manufacturing process, particularly for the layered elements like for example a configuration of a heating means as a heating layer, particularly as a thick film heating.

It can be further provided that with the method according to the invention the connection of the forming area comprises a pressing of the forming areas. Thereby, a thickness of the forming areas can decrease. Therewith, the pressing can preferably comprise a plating and/or a rolling of the forming areas. Further, the connecting of the forming areas can comprise a heating of the forming areas, wherein the heating is preferably performed up to a temperature which is below the melting temperature of the involved materials. Thereby, a solid bond can be achieved. In case the thickness of the forming areas decreases, from an existing plate a wider plate can be achieved by a plastic deformation and at the same time a solid bond can be created which comprises a reliable rigidity in operation.

Within the scope of the invention it is further possible that the provision of the heat exchanger according to step a) comprises further the following step:
  provision of an opening in the heat exchanger,
  therewith the to be produced heat exchanger is suitable to be introduced through the opening of at least one part of the stirrer. Thereby, the to be produced heat exchanger is particularly suitable for the application in a food processor, particularly a food processor with which a part of the stirrer is passaged or can be passaged at the bottom side to the heating element. Preferably, the provision of the opening can be performed in the same tool and/or at the same time with the separation of the form area from the heat conduction plate and the first and/or second functional plate particularly preferred during the same working step. Thus, it is for example possible that the opening and the forming areas are cut in a cutting method particularly in the same stroke or that the cutting method is performed in a film compound tool wherein the forming areas and the openings are cut one after the other.

Preferably, the method can be performed in the shown order of the method steps. It can be initially provided that the heat conducting plate and the first functional plate and/or the second functional plate are provided and subsequently the forming areas of the plates are connected and subsequently a separation occurs. Likewise, it can be provided that the steps are performed in another order such that for example initially the plate is provided, the forming areas a separated from the plate and subsequently the forming areas are connected such that the heat exchanger results. Further, it is possible that the provision of the plate and the connecting of the plate can be performed at the same time. Thus, the method can be for example an additive manufacturing method, particularly a three dimensional print. Further, single or all steps of the method can be repeated as far as it is technically meaningful. As a manufacturing method for the production of a heating means for a cooking pot for a kitchen application the method is therewith further suitable to advantageously produce at least a part of a food processor, particularly a previous described food processor, in a simple manner.

Figure 2:
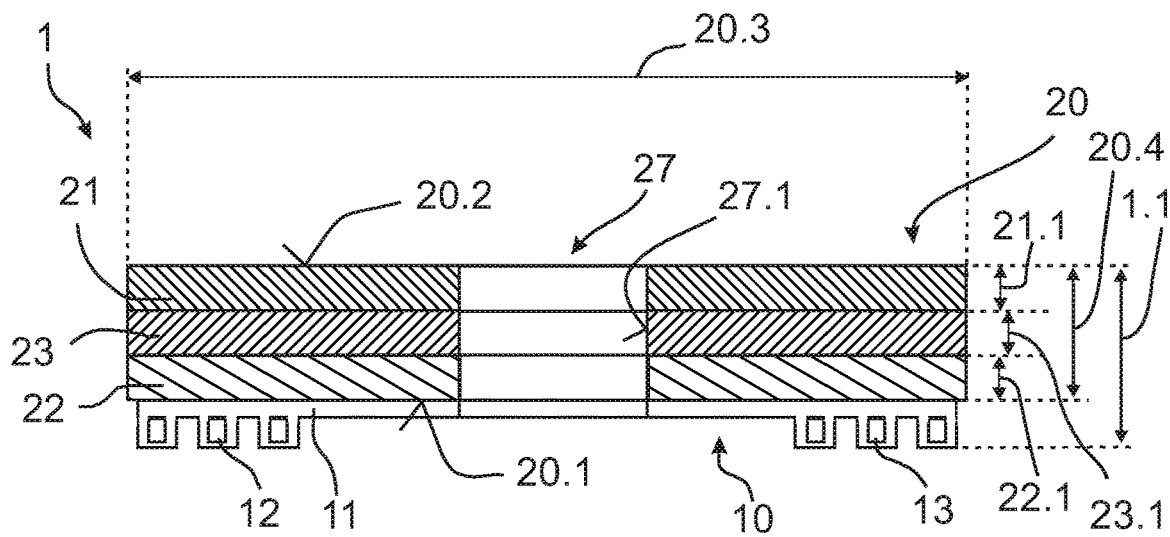
Figure 3:
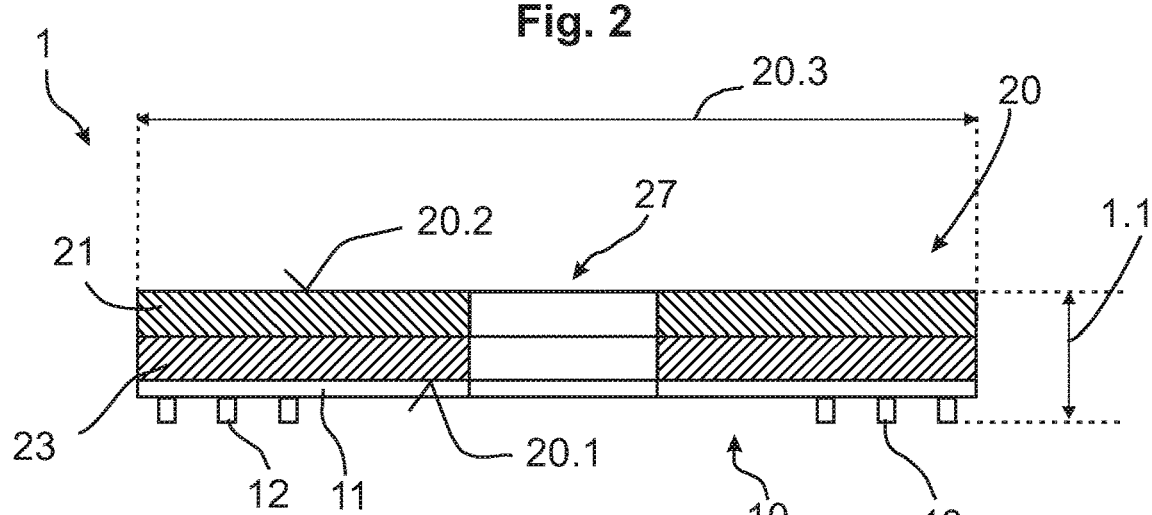
Figure 4:
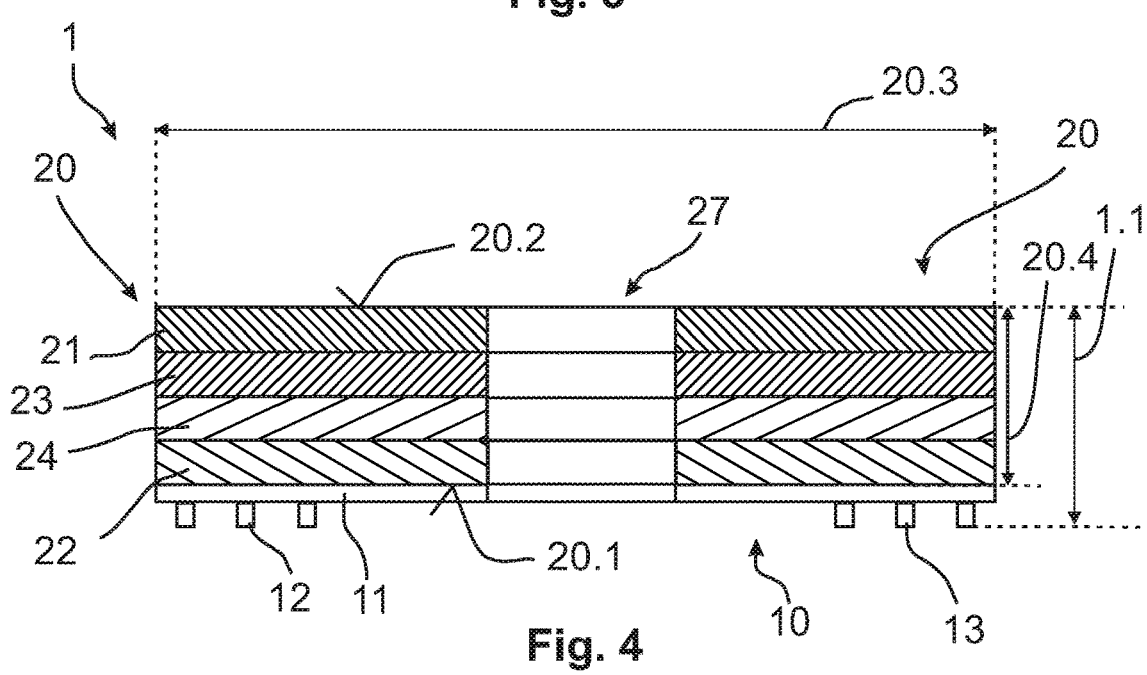
Figure 5:
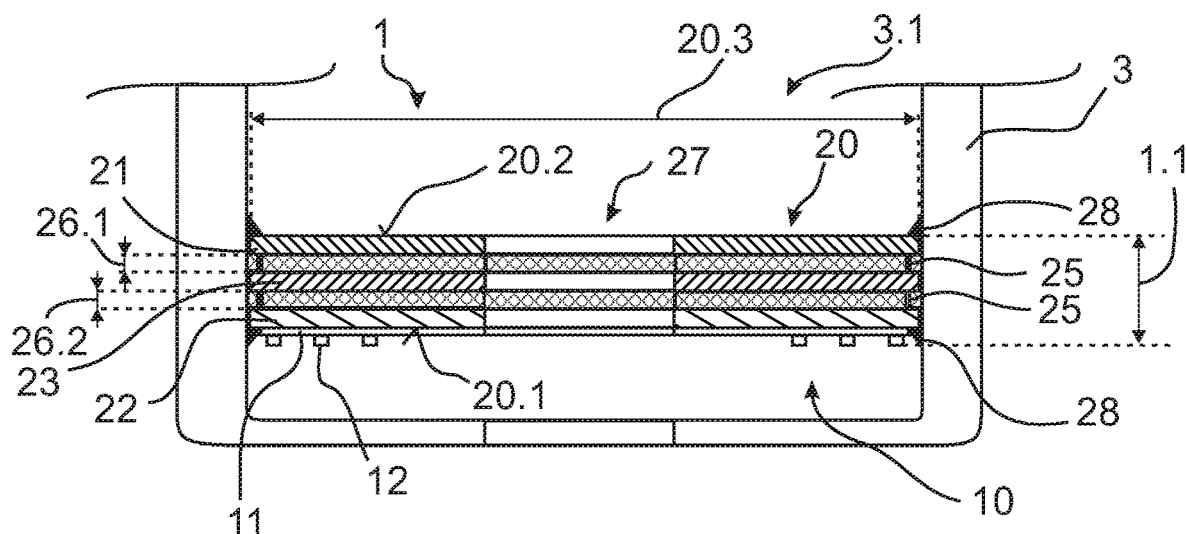
Figure 6:
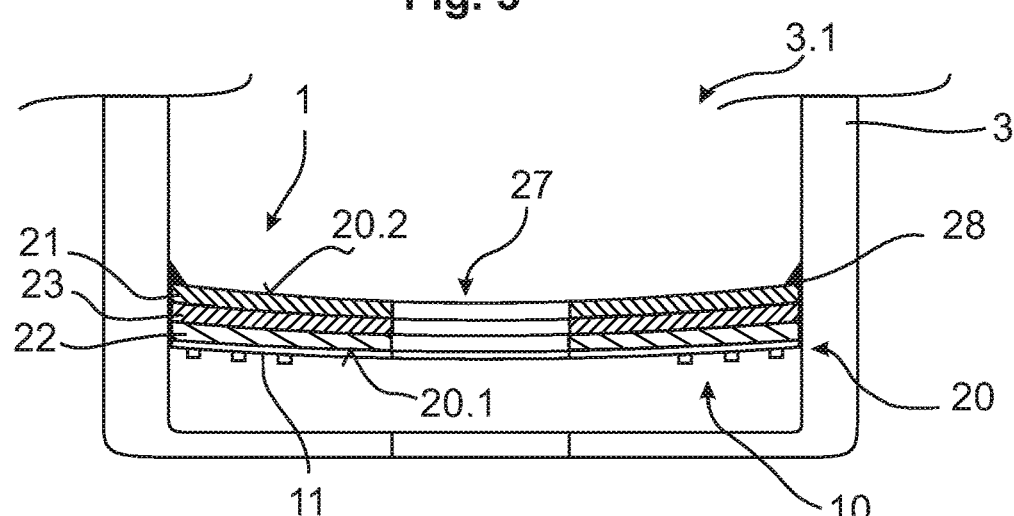
Figure 7:
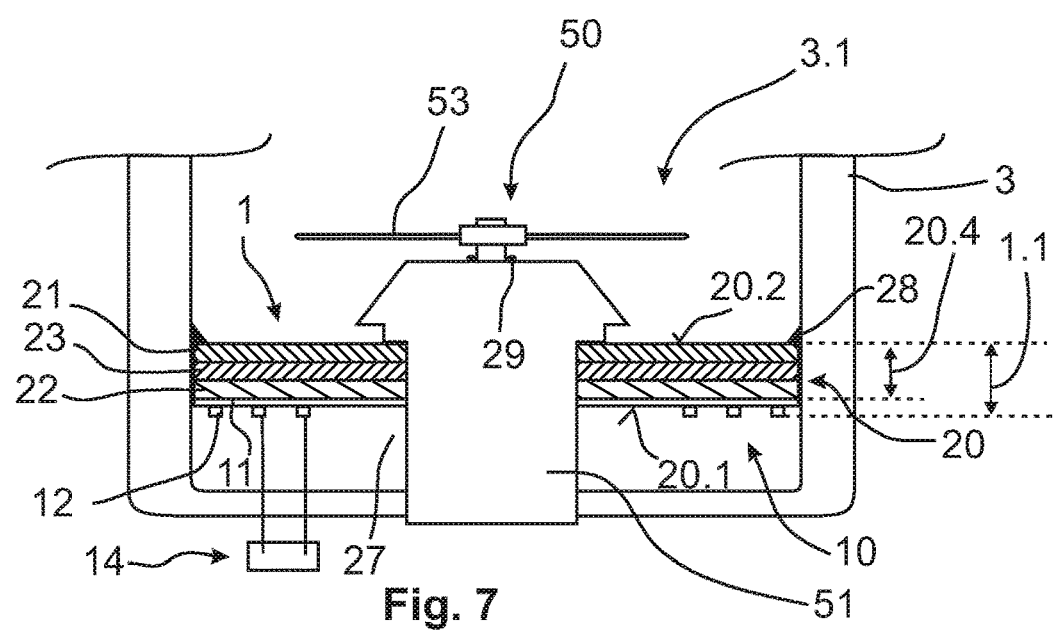
Figure 8:
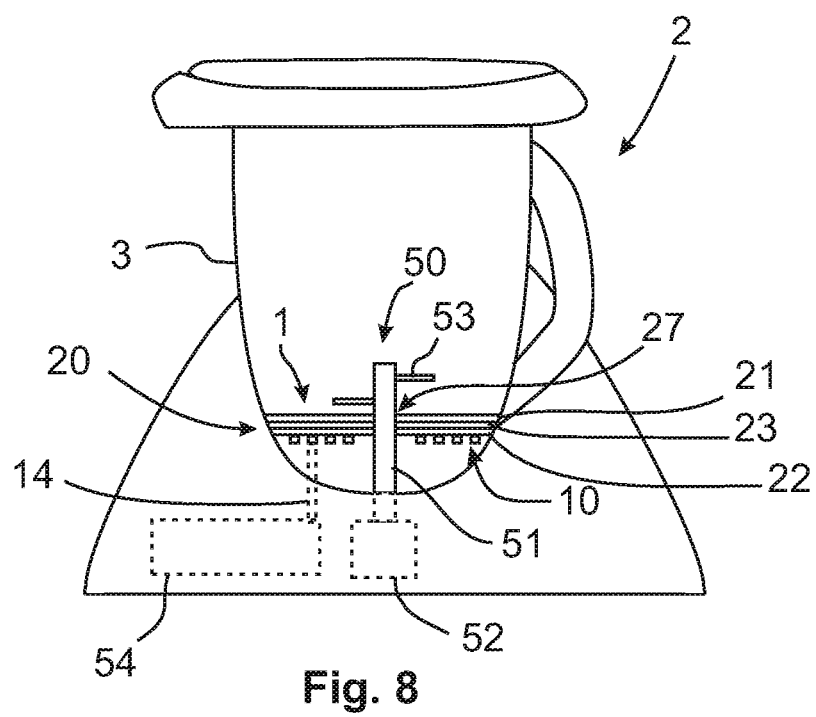
Figure 9:
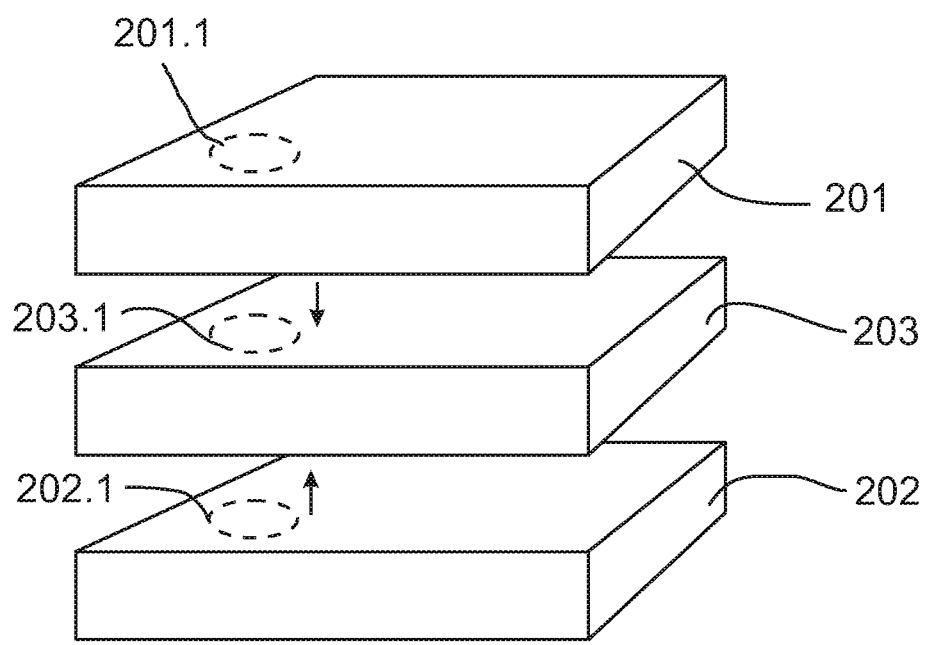
Figure 10:
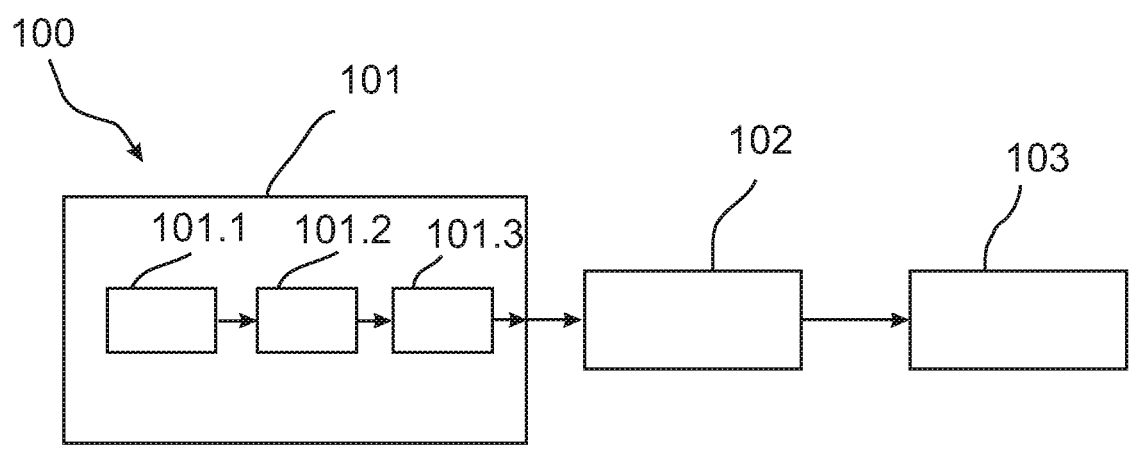

Further, measures improving the invention result from the subsequent description and some embodiments of the invention which are schematically shown in the figures. All features and/or advantages from the claims, the description and the drawings including constructive details, spatial arrangement and method steps can be essential for the invention each single by themselves or in any combination. Thereby, it has to be taken into account that the figures only have descriptive character and are not intended to limit the invention. It is shown:

FIG. 1 a heating element for a cooking pot according to the invention from a lower side in a perspective schematic view in a first embodiment, FIG. 2 a heating element for a cooking pot according to the invention of the first embodiment in a sectional schematic view, FIG. 3 a heating element for a cooking pot according to the invention in a sectional schematic view in a further embodiment, FIG. 4 a heating element for a cooking pot according to the invention in a sectional schematic view in a further embodiment, FIG. 5 a cooking pot according to the invention with a heating element in a further embodiment in a sectional partial view, FIG. 6 a cooking pot according to the invention with a heating element in a sectional schematic view in a further embodiment, FIG. 7 a cooking pot according to the invention with a heating element in a sectional schematic view in a further embodiment, FIG. 8 a food processor according to the invention with a cooking pot according to the invention with a heating element in a further embodiment, FIG. 9 a schematic view of a provision of a heat exchanger of a method according to the invention in a further embodiment, FIG. 10 a method according to the invention a schematic view of the method steps in a further embodiment.

In the subsequent figures for the same technical features even in different embodiments the same reference signs are used. In the present figures, particularly a layer thickness of the shown layers is only schematically shown. The food processor 2 to which it is related in the subsequent embodiments is shown exemplary in FIG. 8.

FIG. 1 shows a heating element 1 for a cooking pot 3 according to the invention for a food processor 2 in a perspective schematic view in a first embodiment. Thereby, the heating element 1 comprises a heating means 10 which is arranged at a heat-absorbing side 20.1 of a heat exchanger 20. The heat exchanger 20 further comprises a metallic heat conducting layer 23 which is arranged sandwich-like between the first functional layer 21 and the second functional layer 22. Thereby, the first functional layer 21 configures at the same time a heat emission side 20.2 of the heat exchanger 20 which is contactable with food. Preferably, the first functional layer 21 can be configured suitable for foodstuffs. Thereby, a first functional layer 21 can for example comprise stainless steel or be made from stainless steel. The heat conducting layer 23 is further, particularly configured from a metal which comprises a higher heat conductivity than the first functional layer 21. Preferably, the heat conducting layer 23 comprises copper and/or aluminium. The heating means 10 is further configured as a heating layer and comprises a first resistance element 12 and a second resistance element 13 with a dielectric 11 which is arranged at least partially between the resistance elements 12, 13 and the heat exchanger 20. The dielectric 11 is thereby configured to prevent an electric contact between the resistance element 12, 13 and the second functional layer 22 to prevent or to at least partially reduce an electric contact between the resistance element 12, 13 and the second functional layer 22 such that the heating means 10 is arranged, particularly directly at the heat exchanger 20. In order to enable a wired current supply the first resistance element 12 and the second resistance element 13 can comprise connecting means 14 which are suitable for a connection at the control unit 54 (like for example shown in an embodiment according to FIG. 8) and/or at a voltage source. Within the heating layer further at least a first sensor 15 and/or a second sensor 16 are arranged for the determination of the local temperature. Thereby, that the heat conducting layer 23 facilitates a homogeneous temperature distribution the temperature measurement can thus be improved.

FIG. 2 shows a heating element 1 for a cooking pot 3 according to the invention for a food processor 2 of the first embodiment in a sectional view. Thereby, it becomes clear that the first resistance element 12 and the second resistance element 13 are at least partially covered by the dielectric 11. Further, the circular disk-like configured heat exchanger 20 comprises an opening 27 which is arranged centrally of the heat exchanger 20. Further, the opening 27 extends through the heating means 10 such that for example a drive means 51 can be passed through (like for example shown in the embodiment according to FIGS. 7 and 8). Preferably, a layer thickness 22.1 of the first functional layer 21 can correspond to between 30% and 70%, preferably between 40% and 60%, particularly preferred approximately 50% of the layer thickness 23.1 of the heat conducting layer 23. Further, analogous the layer thickness 22.1 of the second functional layer 22 can correspond to between 30% and 70%, preferably between 40% and 60%, particularly preferred approximately 50% of the layer thickness 23.1 of the heat conducting layer 23. Accordingly, an overall distribution of a transmission thickness 20.4 of the heat exchanger 20 of the heating element 1 can thus result with which the layer thickness 20.1 of the first functional layer 21 amounts to 25% of the transmission thickness 20.4 the layer thickness 23.1 of the heat conducting layer 23 50% and the layer thickness 22.1 of the second functional layer 22 approximately 25%. Thereby, a maximum diameter 20.3 of the heat emission side 20.2 can be in a relation to an overall thickness 1.1 of the heating measurement 1 of 10 to 250. In order to improve a protection of the heat conducting layer 23 for environmental conditions it can be intended that a front face 27.1 of the opening 27 is coated. Additionally or alternatively for the coating of the front face 27.1 a protective body can be provided, which is introduced into the opening in order to achieve a protection of the heat conduction layer 23. Preferably the protective body can be configured as a bushing. Preferably the coating can be configured from one material with a first and/or the second functional layer 21, 22.

FIG. 3 shows a heating element 1 for a cooking pot according to the invention for a food processor 2 in a further embodiment in a sectional schematic view. Thereby, a heat exchanger 20 of the heating element 1 comprises a first functional layer 21 and a metallic heat conducting layer 23, wherein the heat conducting layer 23 is preferably configured from a material which comprises a higher heat conductivity than the first functional layer 21. At the first functional layer 21 the heat exchanger 20 comprises further a heat emission side 20.2 and at the heat conducting layer 23 a heat-absorbing side 20.1. Thereby, the heat-absorbing side 20.1 is configured to receive heat which is generable by a heating means 10. The heating means 10 is further arranged at the heat-absorbing side 20.1 of the heat exchanger. Thereby, the heating means 10 comprises a first and a second resistance element 12, 13, wherein between the first and second resistance element 12, 13 and the heat connecting layer 23 of the heat exchanger a dielectric 11 is applied layerwise. Preferably, the dielectric 11 can comprise enamel. The enamel can further comprise a cold conducting material or heat conducting material or be configured as a cold conducting material or heat conducting material such that the resistance of the dielectric 11 comprises preferably a temperature depended electric resistance. Thereby, a safety of the heating element 1 and therewith the cooking pot 3 can be increased, particularly during the current supply of the resistance element 12, 13 particularly in different points of operation.

FIG. 4 shows a heating element 1 for a cooking pot 3 according to the invention for a food processor 2 which is shown sectionally schematically in a further embodiment. Thereby, the heating element 1 comprises a heat exchanger 2 for exchanging heat which is generable by a heating means 10. In order to generate heat the heating means 10 comprises a first resistance element 12 and a second resistance element 13 which can be supplied with current and generate heat by an electric resistance. The resistance elements 12, 13 are arranged with a layerwise dielectric 11 at the heat-absorbing side 20.1 of the heat exchanger 20. In order to exchange heat from the heat-absorbing side 20.1 to a heat emission side 20.2 of the heat exchanger 20, the heat exchanger 20 of the embodiment of FIG. 4 comprises four layers, wherein at the heat emission side 20.2 initially a first functional layer 21 is arranged which is contacted with a metallic heat conducting layer 23 and below the heat conducting layer 23 a second functional layer 22 and a further functional layer 24 are provided. The heating element 1 further comprises an opening 27 which is provided centrically. By the further functional layer 24 besides the functions of the first and the second functional layer 21, 22 in contrast to the first embodiment further different functions can be combined in the heat exchanger in that a handy choice of material is selected. Thus, for example a further electric can be embedded in the further functional layer 24. Preferably, further a ratio of a maximum diameter 20.3 of the heat exchanger 20, particularly on the heat emission side 20.2 of the heating element 1 can amount to an overall thickness 1.1 of the heat exchanger 20 with the heating means 10 of the heating element 1 between 10 and 250.

FIG. 5 shows a cooking pot 3 according to the invention for a food processor 2 which comprises a heating element 1 at the bottom side of the cooking pot 3 on the opposing side of the filling opening 3.1. Thereby, the heating element 1 and the bottom side of the cooking pot 3 comprise an opening 27 which is configured to accept a drive means 51 of a stirrer (like shown for example in the embodiment according to FIG. 8). Further, the heating element 1 is at least at a first functional layer 21 of the heat exchanger 20 of a heating element 1 connected via a circumferential welding seam 28. The heat exchanger 20 thereby comprises a first functional layer 21 which is arranged with a distance 20.6 to a metallic heat conducting layer 23 such that generated heat from a heating means 10 is transferable extensively from the heat conducting layer 23 to the first functional layer 21. In order to ensure a connection between the first functional layer 21 and the heat conducting layer 23 further attachment points 25 can be provided which bridge the distance 26.1 between the first functional layer 21 and the heat conducting layer 23. This can for example be a punctual welding or an additional heating means. Below the heat conducting layer 23 further with a distance 26.2 a second functional layer 22 is arranged which configures a heat-absorbing side 20.1 of the heat exchanger 20. Likewise the distance 20.6 between the heat conducting layer 23 and the second functional layer 22 can at least comprise an attachment point 25. Between the first functional layer 21 and the heat conducting layer 23 and/or the second functional layer 22 and the heat conducting layer 23 for example a heat conducting paste or air be provided in order to improve a heat conduction via the respective distance 26.1, 26.2. Likewise, the second functional layer 22 can be connected with the cooking pot 3 via a circumferential welding seam 28. The heating means 10 which is configured to emit heat at a heat-absorbing side 20.1 of the heat exchanger 20 further comprises a resistance element 12 which is arranged with a dielectric 11 at the heat exchanger 20.

FIG. 6 further shows a cooking pot 3 according to the invention for a food processor 2 which is arranged at the bottom side. Thereby, the heating element 1 with a heat emission side 20.2 for heating of food configures the lower side of the cooking chamber of the cooking pot 3. Further, the heating element 1 comprises a heating means 10 which is arranged at the heat exchanger 20. The heat exchanger 20 and particularly the heating means 10 are further configured curved such that the heating element 10 comprises a raised edge in the direction of the filling opening 3.1 of the cooking pot 3. Thereby, food can be preferably heated even in the periphery of the lower side of the cooking pot 3. Alternatively the heating element 10 can extend opposing to the direction of the filling opening 3.1 of the cooking pot 3, a particularly lowering edge. Thereby, the existence of tensile stress in a dielectric 11 of the heating element 10 can be reduced or completely prevented. Preferably, the heating element 10 can be configured such that the heat conductivity of the heating means 10 radially increases or radially decreases such that particularly an uneven heat requirement of food can be taken into account with certain stirring speeds. The heating means 10 of the heating element 1 is further arranged at a heat-absorbing side 20.1 of the heat exchanger 20. The heat exchanger 20 thereby comprises further a second functional layer 22 which is in contact with the heating means 10 via the dielectric 11 of the heating means 10. By the dielectric 11 an electric isolation in relation to a first resistance element 12 of the heating means 10 is given. At the heat emission side 20.2 the heat exchanger 20 further comprises a first functional layer 21 which can be advantageously configured suitable for food. Preferably, the first functional layer 21 and the second functional layer 22 can be configured from one material with the cooking pot 3 such that a weldability of the heating element 1 by a welding seam 28 at the upper and/or lower edge can be given. Between the functional layers 21, 22 further sandwich-like a metallic heat conducting layer 23 is arranged such that a temperature which is generated by the heating means 10 can be evenly distributed in the heat conducting layer 23 which preferably has a good heat conductivity and can therewith be emitted extensively to the first functional layer 21 and therewith, particularly evenly extensively to the food in the cooking pot 3. In this embodiment an opening 27 can be provided such that for example a drive means 51 can be guidable through. Particularly, the shown heating element 1 can for example be a heating element according to the first embodiment.

FIG. 7 shows a cooking pot 3 according to the invention with a heating element 1 for a food processor 2 in a further embodiment. Therewith, a heating means 10 of the heating element 1 comprises at least a first resistance element 12 which can be led out from the cooking pot 3 via at least one connecting means 14 connected to a voltage source and/or a control unit 54. Electrically separated from the first resistance element 12 by a dielectric 11 further a heat exchanger 20 is arranged which is configured at a heat-absorbing side 20.1 for the detection of heat generated from the heating means 10. Thereby, the heat exchanger 20 comprises three layers, a first functional layer 21 which is arranged at the heat emission side 20.2 of the heat exchanger 20, a metallic heat conducting layer 23 and a second functional layer 22 at the heat-absorbing side 20.1. Like in the first embodiment the heat exchanger 20 is thereby configured sandwich-like, wherein the heat conducting layer 23 is arranged between the first and the second functional layer 21, 22. The heating element 1 can thereby be circumferentially welded at the heat-absorbing side 20.1 and/or at the heat emission side 20.2 by a welding seam 28. Thereby, a particularly solid arrangement of the heating element 1 with the cooking pot 3 results. Further, in the present embodiment a drive means 51 of a stirrer 50 is guided through an opening 27 of the heating element 1. In order to ensure a tightness related to food which can be introduced into the cooking pot 3 via the filling opening 3.1 further a sealing 29 is provided which is sealingly arranged with the drive means 51. The drive means 51 is further connected with a stirring means 53 such that a turning of the drive means 51 can likewise turn the stirring means 53. The stirring means 53 can preferably be configured as a knife or whisk. Likewise multiple stirring means are possible.

FIG. 8 shows a food processor 2 according to the invention with a cooking element 3 according to the invention in a further embodiment. Thereby, on the bottom side of the cooking pot 3 a heating element is arranged. The heating element 1 thereby comprises a heat exchanger 20 with multiple layers, particularly a first functional layer 21 at a heat emission side 20.2, a metallic heat conducting layer 23 and a second functional layer 22. At the heat-absorbing side 20.1 of the heat exchanger 20 of the heating element 1 (like for example shown in the embodiment of FIGS. 1 to 7) further a heating means 10 is provided for the active heating of a cooking pot 3 or of food within the cooking pot 3. The heating means 10 is thereby preferably connected with a control unit 54 by a connecting means 14 such that the temperature within the cooking pot 3 is controllable. Further, the heating element 1 comprises an opening 27 through which a drive means 51 of the stirrer 50 is guided, wherein at the drive means 51 stirring means 53 within the cooking pot 3 are arranged which are driven by a drive 52 which is in an operative connection with the drive means 51. By such a configuration food within the cooking pot 3 can be particularly reliably heated such that for example an ideal cooking point of a certain food can be just exactly marked. Particularly, the shown heating element 1 can be a heating element from the first embodiment or one of the further embodiments, particularly of the FIG. 3 or 4.

FIG. 9 shows a connection of forming areas 201.1, 202.1, 203.1 of different plates of a method 100 according to the invention in a further embodiment. Thereby, a first functional plate 201, a second functional plate 202 and a metallic heat conducting plate 203 are connected with one another. The connection can occur partially or completely or in the forming areas 201.1, 202.1, 203.1. Thereby, the first and second functional plate 201, 202 can be preferably sandwich-like pressed with the heat conducting plate 203 such that the heat conducting plate 203 is arranged between the first and second functional plate 201, 202. During pressing a plate thickness of the first and a second functional plate 201, 202 of the heat conducting plate 203 can be altered such that the surface of the plates is enlarged and the connection can be particularly securely ensured. Thereby, further a heating can be provided which occurs at the same time or subsequently to the pressing in order to ensure a corresponding connection of the plate 201, 202, 203. Preferably, the method 100 of the embodiment from FIG. 9 can be a part of the method of the embodiment of the subsequent FIG. 10.

FIG. 10 shows a method 100 according to the invention for the production of the heating element 1 for a cooking pot 3 in a schematic representation of the method steps. Thereby, preferably in a first method step 101 it can be provided that the heat exchanger 20 is provided. Within the scope of this step 101 it is particularly preferably provided that further steps are performed. Thereby, in a method step 101.1 it is provided that a metallic heat conducting layer 203 and a first functional plate 201 and a second functional plate 202 are provided. Thereby, the heat conducting layer 203 and the first functional layer 201 and the second functional layer 202 comprise one of the forming areas 201.1, 202.1, 203.1 respectively. Further, a connecting of the forming areas 201.1, 203.1, 202.1 occurs within the scope of step 101.2, wherein a heat conducting layer 23 in at least a first functional layer 21 results such that heat is transferable extensively from the heat conducting layer 23 to the first functional layer 21. Previous or subsequent to step 101.2 it can be further provided that a further method step 101.3 is performed which comprises a separation of the forming areas 201.1, 202.1, 203.1 from the heat conducting plate 203 and the first and/or second functional plate 201, 202. Preferably, the separation of the forming areas 201.1, 202.1, 203.1 is thereby provided at the same time. In a further method step 102 further an arrangement of a heating means 10 with the heat exchanger 20 is provided, wherein for example the heating means 10 can be printed at the heat exchanger 20 using screen printing, particularly at a heat-absorbing side 20.1 of the heat exchanger 20. Preferably, further a particularly centrally arranged opening 27 of the heat exchanger 20 can be provided. The provision of the opening 20 can preferably occur previous, subsequently and/or at the same time with the separation of the form areas 201.1, 202.1, 203.1 from the heat conducting plate 203 and the first and the second functional plate 201, 202. Particularly, for the production of the opening 27 a material area within the forming area 201.1, 202.1, 203.1 can be separated from the heat conducting plate 203 and the first and/or the second functional plate 201, 202. Particularly, a further method step 103 can be provided which comprises an arrangement of at least one sensor element 15, 16 which together with the heating means 10 can be printed at a heat-absorbing side 22.1 of the heat exchanger 20. Thereby, a simple, cost-efficient method results to produce the heating element 1 which can ensure an even heat distribution over the whole bottom area of the cooking pot 3 of a food processor 2. Particularly, by the shown method 100 a heating element according to one of the embodiments according to FIGS. 1 to 8 can be produced.

The previous description of the embodiments describes the present invention only within the scope of examples. Naturally, single features of the embodiments as far as technically meaningful can be freely combined with one another without leaving the scope of the present invention.

REFERENCE LIST

1 Heating element
1.1 Overall thickness of 10 or 20
2 Food processor
3 Cooking pot
3.1 Filling opening
Heating means
11 Dielectric
12 First resistance element
13 Second resistance element
14 Connecting means
First sensor element
16 Second sensor element
Heat exchanger
20.1 Heat-absorbing side
20.2 Heat emission side
20.3 Maximum diameter
20.4 Transmission thickness
21 First functional layer
21.1 Layer thickness of 21
22 Second functional layer
22.1 Layer thickness of 22
23 Heat conducting layer
23.1 Layer thickness of 23
24 Additional layer
Attachment point
26.1 Distance between 21 and 23
26.2 Distance between 22 and 23
27 Opening
28 Welding seam
29 Sealing
50 Stirrer
51 Drive means
52 Drive
53 Stirring means
54 Control unit
100 Method
101 Method step
101.1 Method step
101.2 Method step
101.3 Method step
102 Method step
103 Method step
201 First functional plate
201.1 Forming area of 201
202 Second functional plate
202.1 Forming area of 202
203 Heat conduction plate
203.1 Forming area of 203

The invention claimed is:

1. A cooking pot for a food processor with a heating element, wherein the heating element comprises:
a heating device for generating heat, and
a heat exchanger with a heat-absorbing side at which the heat exchanger is heatable by the heating device and a heat emission side for heating of foodstuff in the food processor,
wherein the heat exchanger comprises an opening for a stirrer and a first functional layer at the heat emission side,
wherein
the heat exchanger comprises at least partially a metallic heat conducting layer, which is arranged with the first functional layer such that the heat generated by the heating device is transferable extensively from the heat conducting layer to the first functional layer,
wherein the heating device is a heating layer, which is directly arranged at the heat conducting layer or a second functional layer of the heat exchanger, and
wherein the heating layer comprises a dielectric in order to electrically isolate an electric component of the heating device from the heat exchanger.

2. The cooking pot according to claim 1,
wherein
the heat conducting layer is arranged between the first functional layer and a second functional layer.

3. The cooking pot according to claim 2,
wherein
at least the first or the second functional layer is configured suitable for foodstuff.

4. The cooking pot according to claim 3,
wherein
at least the first or the second functional layer comprises a stainless steel or is consisting of stainless steel.

5. The cooking pot according to claim 1,
at least wherein
the opening is arranged in the centre of the heat exchanger or wherein the heat exchanger is configured disk-like.

6. The cooking pot according to claim 1,
wherein
a layer thickness of the first functional layer is between 30% and 70% which corresponds to a layer thickness of the heat conducting layer.

7. The cooking pot according to claim 1,
wherein
the heating device comprises at least one first resistance element, which is at least wired or inductively energizable for the generation of heat.

8. The cooking pot according to claim 7,
wherein
at the first resistance element at least sectionally a dielectric is arranged.

9. The cooking pot according to claim 1,
wherein
at the heat exchanger at least one first sensor element is arranged.

10. A food processor with a cooking pot and a drive for a stirrer,
wherein
the cooking pot is configured according to claim 1.

11. A method for the production of a heating element for a cooking pot for a food processor comprising the following steps:

a) providing a heat exchanger comprising the following steps:
 providing a metallic heat conduction plate and at least one first functional plate, wherein the heat conduction plate and the first functional plate each comprise at least one forming area, and
 connecting at least the forming area of the heat conduction plate with the forming area of the first functional plate, wherein a heat conducting layer and at least one first functional layer with a heat emission side results such that heat is transferable extensively from the heat conducting layer to the first functional layer, and
b) arranging a heating device at the heat exchanger,
 wherein the heating device is a heating layer, which is directly arranged at the heat conducting layer or a second functional layer of the heat exchanger, and
 wherein the heating layer comprises a dielectric in order to electrically isolate an electric component of the heating device from the heat exchanger.

12. The method according to claim 11,
wherein
the provision of a heat exchanger according to step a) further comprises a provision of a second functional plate, which comprises a further forming area, which is connected with the forming areas of the heat conducting layer and the first functional plate such that a second functional plate of the heat exchanger is generated.

13. The method according to claim 12,
wherein
the connection of the forming areas comprises a pressing of the forming areas.

14. The method according to claim 12,
wherein the forming area of the heat conducting plate is arranged sandwich-like between the forming areas of the first and second functional plate.

15. The method according to claim 11,
wherein
the provision of the heat exchanger according to step a) further comprises the following step:
separation of the forming areas from the heat conducting plate and at least the first or second functional plate.

16. The method according to claim 11,
wherein
the arrangement of the heating device at the heat exchanger comprises a printing of a heat layer to the heat exchanger.

17. The method according to claim 11,
wherein
the provision of the heat exchanger according to step a) further comprises the following step:
provision of an opening in the heat exchanger.

18. The method according to claim 15,
wherein the separation of the forming areas from the heat conducting plate and one of the functional plates or both functional plates is provided at the same time.

19. The method according to claim 11,
wherein the method is suitable for the production of the heating element of the cooking pot, wherein the heating element comprises the heating device for generating heat and the heat exchanger with the heat-absorbing side at which the heat exchanger is heatable by the heating device and the heat emission side for heating of foodstuff in the food processor, wherein the heat exchanger comprises an opening for a stirrer and a first functional layer at the heat emission side wherein the heat exchanger comprises at least partially a metallic heat conducting layer, which is arranged with the first functional layer such that the heat generated by the heating device is transferable extensively from the heat conducting layer to the first functional layer.

* * * * *